UNITED STATES PATENT OFFICE.

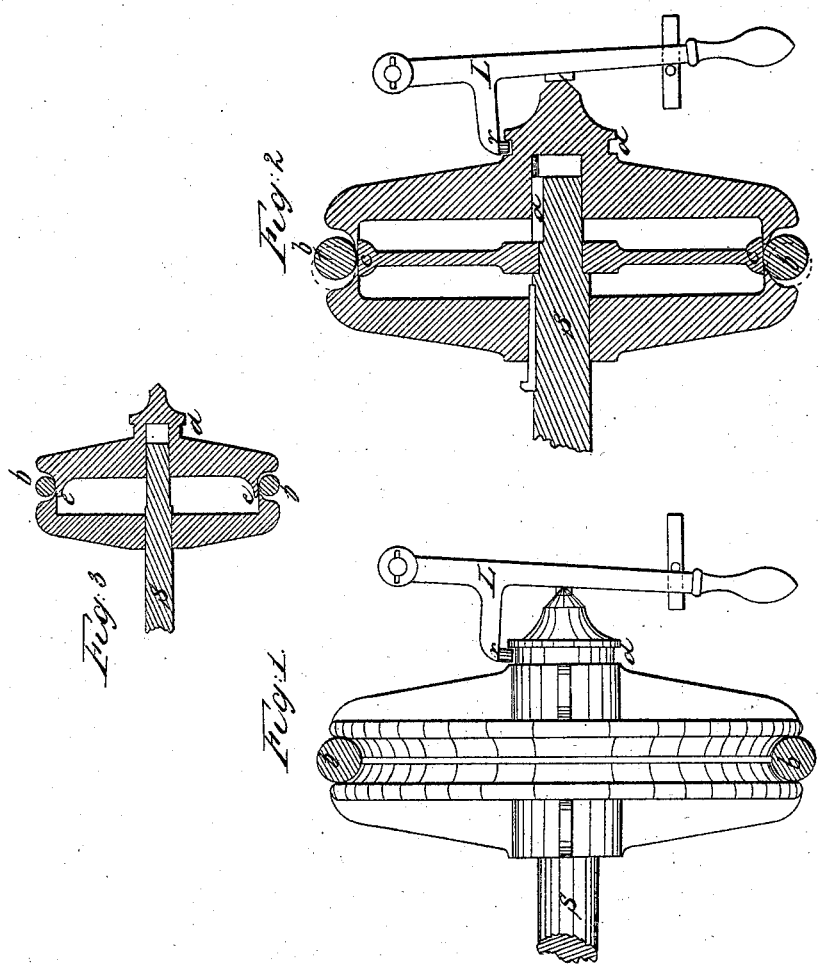

JOHN SHINN, OF LEVERINGTON, ASSIGNOR TO HIMSELF AND WILLIAM ADAMSON, OF GERMANTOWN, PENNSYLVANIA.

IMPROVEMENT IN CLUTCH-PULLEYS.

Specification forming part of Letters Patent No. 33,321, dated September 17, 1861.

*To all whom it may concern:*

Be it known that I, JOHN SHINN, of Leverington, county of Philadelphia and State of Pennsylvania, have invented certain new and useful Improvements in Clutch-Pulleys for Round Belts; and I do hereby declare that the following is a full, clear, and exact description of the construction and operation of the same, reference being had to the annexed drawings, making a part of this specification, in which—

Figure 1 is a face or front view. Fig. 2 is a section through the center; and Fig. 3 is a section through the center, showing a modification of the same.

Similar letters in the figures represent the same parts.

The nature of my invention consists in the method of arranging a groove-pulley so as to adapt the use of a round belt to the driving of light machinery, such as power-looms, warping-machines, dressing-frames, speeders, &c., now used in cotton manufactories. It is also well adapted to sewing-machines, where they are operated by power, and to various other machines and machinery, where frequent stopping and starting are required.

To enable others skilled in the art to make and operate my improvements, I will describe the construction and operation of the same by referring to the drawings.

Fig. 1 represents the face of the pulley, which is made in two parts divided in the center of the groove. The part to the left is keyed fast to the shaft S and the part to the right is made to slide on the feather $a$ in the shaft S. (Seen in Fig. 2.) On the right of the hub is turned a groove $d$, and in the end of the hub is a steel center. The rim of the pulley is turned under the groove so as to admit the loose pulley $c$, Fig. 2, which is made to work inside of the two parts and loose on the shaft S. The pin $r$ in the arm of the lever L is simply for drawing the pulley apart and should not touch the left of the groove $d$, so that by pressing the lever L to the left all of the friction will be on the center and the step in the lever L, which should be steel and hardened. When it is desirable to stop, the lever L will be drawn to the right and the belt $b$ will rest on the loose pulley $c$, as seen in Fig. 2. When it is desirable to start, press the lever L to the left, which will force the groove together, causing the pulley to bight the belt, as seen in Fig. 1.

In operating my improvement the center can only be used when the pulley is placed on the end of the shaft, and when used on any other part of the shaft the groove $d$ and pin $r$ only will be used to force it in and out of gear. The improvement may be so modified as to dispense with the central pulley $c$ by removing the feather $a$, and having the part of the pulley to the right loose on the shaft, and having the rim of that part of the face of the pulley marked $e$, Fig. 3, turned to fit under the groove of the other part of the pulley. As the pulley is drawn apart, the belt will rest on the face of the loose pulley, as seen in Fig. 3. This modification is not desirable except where little power is required, such as sewing-machines.

I claim—

The combination of a groove-pulley constructed in sections with a central loose pulley or a central support loose on the shaft when the shaft is stopped, as specified, and for the above-described purposes.

JOHN SHINN.

Witnesses:
 CHARLES RILEY,
 THOMAS RILEY.